US006242990B1

United States Patent
Sokolov

(10) Patent No.: US 6,242,990 B1
(45) Date of Patent: Jun. 5, 2001

(54) QUADRATURE PHASE SHIFT KEYED/BI-PHASE SHIFT KEYED MODULATOR

(75) Inventor: Vladimir Sokolov, Shakopee, MN (US)

(73) Assignee: TLC Precision Wafer Technology, Inc., Mpls., MN (US)

( * ) Notice: Subject to any disclaimer, the term of this patent is extended or adjusted under 35 U.S.C. 154(b) by 0 days.

(21) Appl. No.: 09/334,204

(22) Filed: Jun. 16, 1999

(51) Int. Cl.[7] .................................. H03C 3/10; H01P 1/18
(52) U.S. Cl. .......................... 332/103; 332/146; 333/164; 375/308; 455/111; 455/42
(58) Field of Search ..................................... 375/308, 257, 375/282, 283; 332/103, 146; 333/164; 455/42, 111, 110

(56) References Cited

U.S. PATENT DOCUMENTS 5,424,696 * 6/1995 Nakara et al. ...................... 333/156

OTHER PUBLICATIONS

Embedded Transmission Line (ETL) MMIC for Low–Cost, High–Density Wireless Communication Applications by H.Q. Tserng, et al., 1997 IEEE Radio Frequency Integrated Circuits Symposium (0–7803–4603–9/97).
Embodded Transmission Line (ETL) MMIC for Low–Cost, High–Density Wireless Communication Applications by H.Q. Tseng, et al., 1997 IEEE Radio Frequency Integrated Circuits Symposium (0–7803–4603–9/97).
A Ka–Band GaAs Monolithic Phase Shifter by V. Sokolov, et al., IEEE Transactions on Microwave Theory and Techniques, vol. MTT–31, No. 12, Dec. 1983, pp. 1077–1083.
Resonated GaAs FET Devices for Microwave Switching, by W. McLevige, et al, IEEE Transactions on Electron Devices, vol. ED028, No. 2, Feb. 1981, pp. 198–204.

* cited by examiner

Primary Examiner—Arnold Kinkead
(74) Attorney, Agent, or Firm—Roger W. Jensen

(57) ABSTRACT

A phase modulator for communication applications is constructed in so as to be easily implemented by way of MMIC technology. A phase modulator section is followed by a saturated amplifier section so as to provide substantially constant amplitude for all bits or states. The phase modulator section is a bi-phase shift keyed or quadrature-phase shift keyed modulator constructed in accordance with the present invention for discretely varying the phase of an input carrier signal between two or four possible phase states, respectively. The bi-phase shift keyed modulator includes at least a first pair of first and second transmission line segments and a pair of switches which each serve as a single-pole double-throw switch for operatively connecting one of the pair of transmission line segments between an input associated with the first switch, and an output associated with the second switch. The length of the transmission line segment of each of the first and second line segments differs by a first selected difference value determined at a desired operating carrier signal. A control means is provided to control the gate voltages of each of the field effect transistors of each of the switches so as to provide Bi-phase switching of the carrier signal. The quadrature-phase shift keyed modulator is accomplished by adding, in tandem, a second switch selectable pair of transmission line segments to the first pair constituting the bi-phase shift keyed modulator. The post amplifier section employs an amplifier driven into saturation so as to ensure minimal amplitude variation in the output signal whole while maintaining a substantially constant selected phase state.

7 Claims, 2 Drawing Sheets

QUADRATURE PHASE SHIFT KEYED/BI-PHASE SHIFT KEYED MODULATOR

FIELD OF THE INVENTION

The present invention relates generally to high frequency (microwave and mm-wave) modulators, and more specifically to a modulator, for communications applications, for producing a high frequency carrier signal so as to have one of four possible quadrature phase states in response to a simple modulation control voltage.

BACKGROUND OF THE INVENTION

Phase modulation of a carrier signal is, of course, well known for transmitting information onto a carrier signal. A common practice in communications is to employ bi-phase shift keyed (BPSK) or quadrature phase shift keyed (QPSK) modulation of the carrier signal to impart information thereon. That is, a receiver may detect variations in phase of a received carrier signal for obtaining information on the carrier signal. Applications for such phase shift keyed modulators include, among others, satellite communications and terrestrial digital radio systems.

High frequency phase modulators, as used herein, refer to those associated with microwave and mm-wave phase shift keyed applications. High frequency phase modulators are particularly difficult to construct economically to meet the performance requirements of having essentially constant amplitude for all phase states, and substantially constant phase states over a narrow bandwidth. A common practice for constructing such phase modulators is the employment of modulation techniques at low frequencies, and then to up-convert or frequency translate the resulting modulation waveform to the higher frequency. Such practices involve extra mixing circuitry and necessitate complex circuitry. For microwave and mm-wave applications, such complex circuitry adds to the degradation of performance due to, among others, signal insertion loss and signal degradation.

A phase shift keyed modulator is illustrated in a paper entitled, "Embedded Transmission Line (ETL) MMIC for Low Cost, High-Density Wireless Communication Applications," by H. Q. Tserng, et.al., in 1997 IEEE Radio Frequency Integrated Circuits Symposium (0-7803-4603-9/97), incorporated herein by reference. In this paper, four pairs of transmission line segments are fabricated by way of MMIC technology. These line segments are switched in and out to provide a 16-state phase modulator for phased array radar applications. For radar applications, it is desired to a have a multi-bit phase shifter in which each phase state the phase is intended to be a linear function of frequency.

The phase shift keyed modulator of Tserng, et.al., although acceptable for radar applications, it is unacceptable for communication applications. This is so, since ideally it is not acceptable in communication applications for the phase to change with input frequency.

Therefore, there is a need for phase modulator for high frequency communication applications that is simple to construct, simple in structure, and provides good performance.

There is a need for a high frequency phase modulator which provides a quadrature-phase or bi-phase change which is substantially constant with frequency over a narrow bandwidth and which is simple to implement using MMIC integrated circuit fabrication technology.

SUMMARY OF THE INVENTION

An object of the present invention is to provide a simple phase modulator for communication applications, which is easily fabricated in accordance with hybrid or MMIC fabrication techniques.

An object of the present invention is to provide a phase modulator where the amplitude remains substantially constant.

Another object of the invention is to provide a phase modulator which imparts directly onto a microwave or mm-wave carrier signal one of two or four possible phase states and to switch them by way of a simple control voltage.

In accordance with the present invention, a high frequency phase modulator for communication applications is constructed for discretely varying the phase of an input carrier signal between two possible phase states, where the imparted phase change is substantially constant over a narrow frequency bandwidth. The phase modulator includes a phase modulator section followed by a saturated power amplifier. The phase modulator section includes a phase bit circuit combination of at least a first pair of first and second transmission line segments and a pair of switches, where each switch serves as a single-pole double-throw switch. The phase bit combination of components are arranged for operatively connecting one of the pair of transmission line segments between an input associated with the first switch, and an output associated with the second switch. The length of the transmission line segment of each of the first and second line segments differs by a first selected difference value, in terms of desired radian phase delay determined at a desired operating carrier signal. A control means is provided to control the gate voltages of each of the field effect transistors of each of the switches so as to provide Bi-phase switching of the carrier signal. The output of the phase modulator section is provided as an input to a saturated power amplifier whose output is the intended communications signal.

In another embodiment of the invention, the phase modulator section includes a second phase bit circuit combination including an additional pair of switches and an additional pair of transmission line segments of predetermined length difference value are employed to provide phase quadrature switching of the carrier signal between 4 possible phase states.

DETAILED DESCRIPTION OF THE INVENTION

Figure 1:
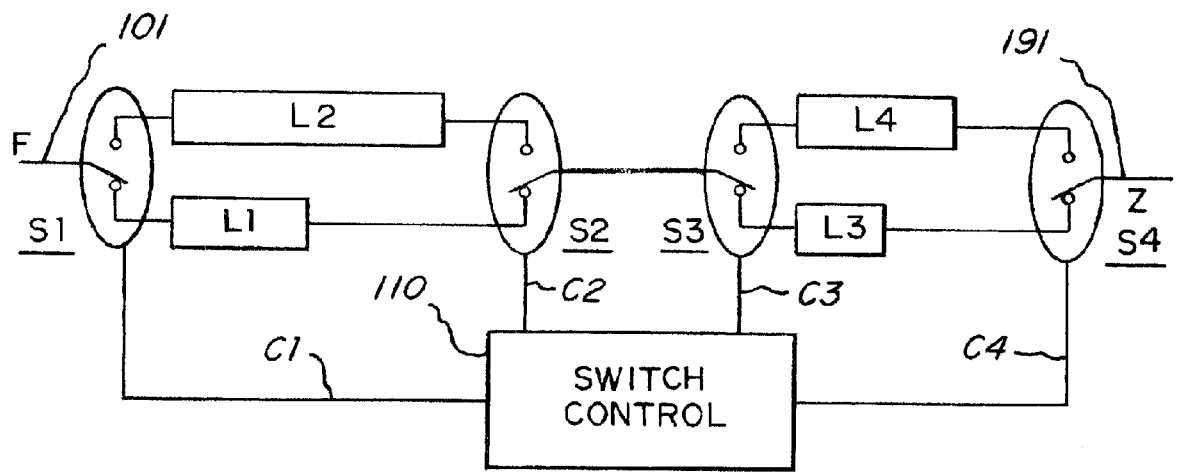
FIG. 1 is a simplified schematic block diagram illustrating the principles of the present invention.

Illustrated in FIG. 1 is a simplified schematic block diagram of the phase modulator in accordance with the present invention. There shown is a phase modulator section including (i) a first pair of transmission line segments L1 and L2 differing in length by a first value to impart a first selected predetermined transmission delay relative to each other, and (ii) a second pair of transmission line segments L3 and L4 differing in length by a second value to impart a second predetermined transmission delay relative to each other. Further shown are four single-pole double-pole switches identified as electronically controlled switches S1, S2, S3, & S4 for selectively interconnecting one of each pair of transmission line segments.

Switch S1 is intended to receive at its input 101 a carrier signal F intended to be phase modulated. Switch S4 provides at its output 191 a phase shifted carrier signal Z having a phase shift relative to the input signal S dependent upon the states of each of the switches S1–S4 as will be subsequently described.

Each of the switches S1–S4 is responsive to one or more independent signals on control signal lines C1–C4, respectively from switch control 110. Switch control 110 is operative to control the states of the switches S1–S4 in manner so as to impart one of four possible quadrature phases states onto the output carrier signal Z with respect to the input carrier signal F. That is, the output carrier signal Z is intended to have a phase relationship as compared to the input carrier signal F which differs by one of four possible phase states or phase differences. Dependent upon the design choice for electronically controlled switches S1–S4, each of the signal lines C1–C4, respectively, may be one or more actual signal lines from switch control 110.

In accordance with the present invention, transmission line segments L1–L4 serve as delay lines for precisely imparting a phase delay relative to the input carrier signal F and the output carrier signal Z. The amount of phase delay is dependent upon which of the selective ones of the transmission line segments L1–L4 that the input carrier signal is routed therethrough. In accordance with the present invention, transmission line segments L1–L4 are constructed so as to meet the following criteria:

$\beta_2 L_2 - \beta_1 L_1 = \pi/2$ and $\beta_4 L_4 - \beta_3 L_3 = \pi$

Where:

L1, L2, L3, L4=path length of respective transmission line segments (cm), $\beta_n = \omega_0/(v_{ph})_n$ where n=1 2, 3, or 4 corresponding to transmission line segments L1, L2, L3, & L4, respectively;

$\omega_0 = 2\pi f_0$ $(v_{ph})_n$=phase velocity of the carrier signal along the respective transmission line segments (cm/sec), where n=1, 2, 3, & 4 corresponding to transmission line L1, L2, L3, & L4 segments, respectively;

and $f_0$=center frequency of operation (Hz).

It should be noted that usually, $\beta_1 = \beta_2 = \beta_3 = \beta_4$, since the transmission line segments L1, L2, L3, and L4, respectively are intended to be fabricated on the same dielectric (e.g., alumina for a hybrid circuit, or GaAs for a monolithic circuit). For generality, the $\beta$'s could be different. In that case, the phase velocity of each transmission line segment would be different as well. Therefore, the more general notations $\beta_n$ & $(v_{ph})_n$ have been used in the above expressions.

The combination of the pair of transmission line segments L1 & L2, along with switches S1 and S2, is defined as the 90° phase bit circuit combination, and the combination of the pair of transmission line segments L3 & L4, along with switches S3 and S4, is defined as the 180° phase bit circuit combination. The carrier input signal F is intended to be routed through selected pairs of paths L1–L4 so as to follow one of four possible paths defined by the independent state of switches S1–S4. More specifically, the input carrier signal F is intended to pass through one of the following paths and obtain the desired phase shift as follows:

a. Transmission along paths L1 and L3 is defined as the reference or 0° path;
  b. Transmission along paths L2 and L3 is defined as the 90° path;
  c. Transmission along paths L1 and L4 is defined as the 180° path; and
  d. Transmission along paths L2 and L4 is defined as the 270° path.

The transmission line segment difference of the transmission line segments associated with each of the phase bits is designed to correspond to the specific phase shift assigned for that bit at the center frequency of the input carrier signal. Thus, for any desired given phase state of the four possible phase states, the switches S1–S4 are set in pairs for conducting the carrier signal F through one leg or transmission line segment of each phase bit, and non-conducting or blocking the signal in the other leg.

Figure 2:
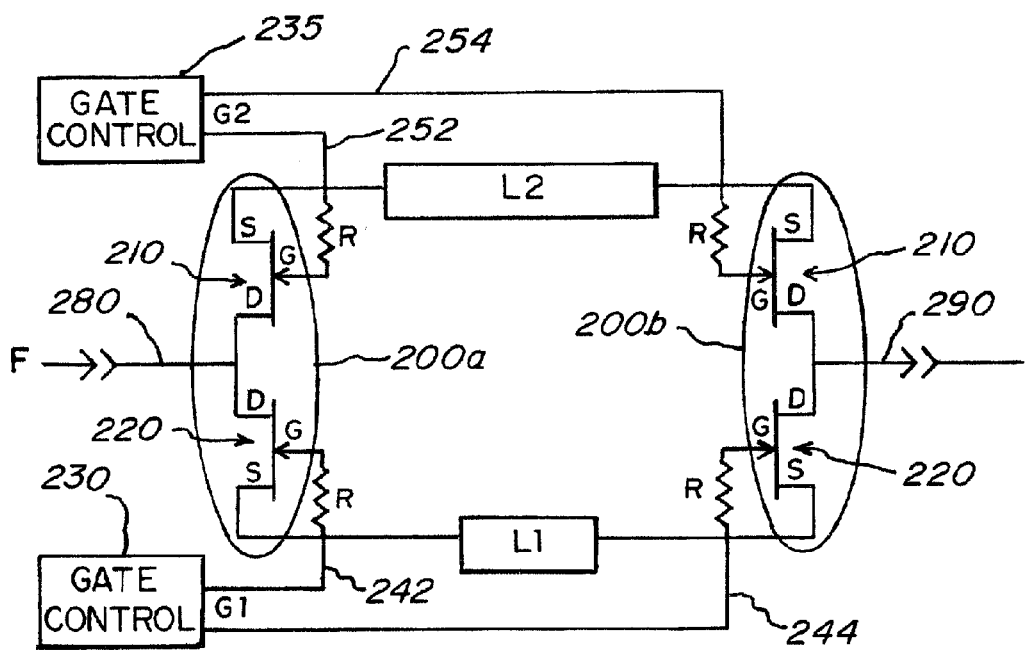
FIG. 2 is schematic circuit diagram illustrating a phase bit circuit combination.

Referring now to FIG. 2, thereshown is a more detailed schematic diagram of the "90° phase bit" where each of the switches S1 and S2 of the circuit of FIG. 1 are replaced by identical switches 200a and 200b. FIG. 2 shows the relation of switches 200a and 200b with respect to transmission line segments L1 and L2, for illustrative purposes. Each identical switch 200a and 200b includes similarly arranged field effect transistors 210 and 220 with independent gate controls.

FIG. 2 illustrates an exemplary arrangement of field effect transistors serving as switches 200a and 200b. In FIG. 2, the drain terminal or drain region of each of the field effect transistors 210 and 220 of switch 200a are connected in common and serve to form an input means 280 for receiving an input carrier signal F which is intended to conduct or transmit through one or the other of transmission line segments L1 or L2. The drain regions of field effect transistors 210 and 220 of switch 200b are connected in common, and serve to form an output means 290 for providing an output carrier signal Z, namely, the input carrier signal F after passing through one or the other of the transmission line segments L1 or L2. The source region of transistor 220 of switch 200a is connected to one terminating end region of transmission line segment L1, and the source region of transistor 210 of switch 200a is connected to one terminating end region of transmission line segment L2. Similarly, the source region of transistor 220 of switch 200b is connected to the other terminating end region of transmission line segment L1, and the source region of transistor 210 of switch 200b is connected to the other terminating end region of transmission line segment L2.

A first gate control 230 provides a common gate control bias signal G1 for each gate region of transistor 220 of switches 200a and 200b through signal lines 242 and 244, respectively. The gate control bias signal G1 is separately coupled to each respective gate region through a series resistors R. The value of the gate bias signal provided to transistors 220 determines whether or not transistors 220 are in the conducting state or the "pinch-off" state (i.e., non-conducting). Similarly, a second independent gate control 235 provides a common gate control bias signal G2 for each gate region of transistor 220 of switches 200a and 200b through signal lines 252 and 254, respectively. Similarly, the gate bias signal G2 is separately coupled to each respective gate region through a series resistor R. Gate control 235 similarly determines whether or not transistors 210 of each switch 200a and 200b is in the conducting or non-conducting state. Gate control signal G1 is intended to be the compliment of gate control signal G2, i.e., when transistors 210 are "off," transistors 220 are "on," and vise versa.

It should be noted that at microwave frequencies, the impedance between source and drain of a field effect transistor at pinch-off is significantly reduced due to substantial displacement current flowing through the capacitance between the source and drain terminals or regions. As a consequence, switch OFF state isolation may be degraded.

In the preferred embodiment of the invention, a short transmission line segment is connected between source and drain of each of the switching field effect transistors, 210 and 220. The short transmission line segment is intended to cause a parallel-resonance with the pinch-off capacitance at center frequency and thereby restore high pinch-off impedance, and improve switch OFF state isolation at microwave frequencies.

Although two independent gate controls 230 and 235 are shown in FIG. 2 it may be desirable to provide independent gate control for each of the gates to avoid any cross coupling of the circuit signals. This is, of course, a matter of design choice.

Field effect transistors 210 and 220 are intended to be of a design so as to be operated with zero drain voltage, and are controlled by the gate control which provides a signal between "0" volts and the "pinch-off" voltage of the FET—such transistors, or variations thereof, being commonly known in the art of MMIC technology to control and route microwave signals. Since such FET transistors draw substantially no current (other than a switching transient on the gate), the phase bit circuits consume virtually negligible power in the static state.

In the practice of the present, it should be noted that modulation of the carrier signal by way of the gate control circuits and the two phase bit circuits is such that the gate bias signal is essentially a digital train of pulses. By way of example, FIG. 2 illustrates the use of n-channel FETs for transistors 210 and 220.

For the n-channel scenario as illustrated, gate control 230 is intended to provide a digital train of pulses having a high voltage value of near "0" gate voltage—i.e., the gate bias at ground potential—so as to cause both transistors 220 to be in a "conduction state"; or provide a low reference voltage so as to cause both transistors 220 to be in the high impedance or non-conducting state, i.e., the pinch-off voltage, e.g., –2 volts. Gate control 235 is intended to provide a complementary gate voltage to transistors 210 as compared to that of the gate control voltage provided by gate control 230. More specifically, gate control 235 is intended to provide a gate bias signal to pinch off transistors 210 while transistors 220 are in the conductive state—i.e., –2 volts, and provide a gate ground potential to cause transistors 210 to be in the conductive state while transistors 220 are in the non-conductive state,—i.e., 0 volts, or visa versa depending on the phase state selected.

As further illustrated in FIG. 2, each gate control signal is provided to their respective gates through an isolation network. Because the field effect transistor gate region draws essentially no current (once the switching transients die down and steady state is reached), a simple series resistor may serve the isolation function as shown schematically in FIG. 2. As illustrated in FIG. 2, the isolation network is illustrated as a simple series resistor R in the order of a 1000 ohms in series with each transistor gate region and corresponding gate control signal line 242, 244, 252, and 254, respectively.

The purpose of the isolation network or circuit is to prevent RF leakage into the gate bias control signal lines and cause unwanted interaction with the carrier signal. This is, of course, a common practice in most microwave circuits which employ active devices that must be biased in order to function. This is particularly a concern in high frequency applications and fabrication with MMIC technology.

It should be noted that such isolation resistors may be readily implemented in MMIC format. The value of the resistance and the capacitance of the FET determine the switching speed through the R-C time constant. With a 1000 ohm value for the series resistance R, and a 400 $\mu$m FET gate capacitance, the switching speed will be in the order of a nanosecond.

Figure 3:
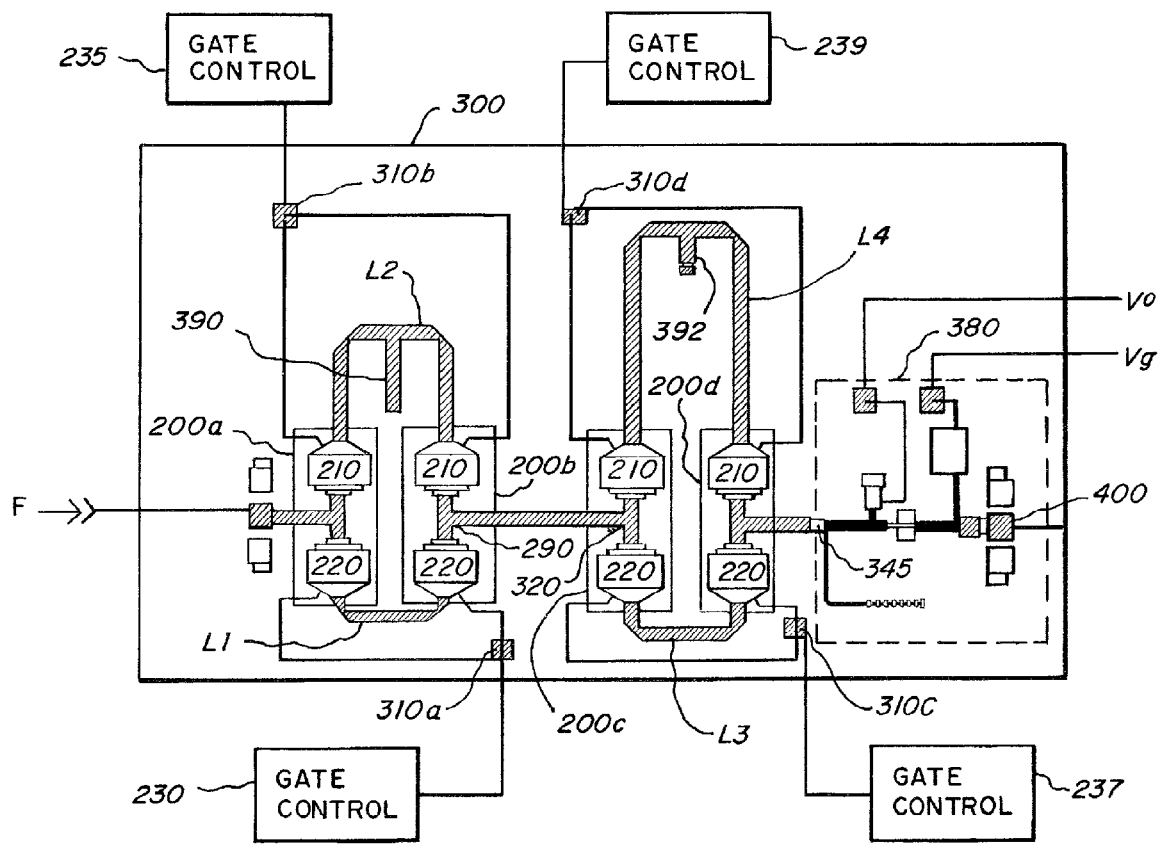
FIG. 3 is mm-wave fabrication layout of the phase modulator of the present invention.

Illustrated in FIG. 3 is a monolithic microwave integrated circuit (MMIC) implementation 300 of the phase modulator in accordance with the present invention including a phase modulator section as that already described and an amplifier section. In FIG. 3, like components as those of FIGS. 1 & 2 have retained the same numeral designation. The arrangement of the combination of switches 200c and 200d and transmission line segments L3 and L4, serving as the 180° phase bit, is identical to that of the arrangement of the combination of switches 200a and 200b and transmission line segments L1 and L2. The gates of transistors 210 of switches 200c and 200d are independently controlled by a common gate signal provided by gate control 239, and the gates of transistors 220 of switches 200c and 200d are independently controlled by a common gate signal provided by gate control 237.

Gate controls 237 and 239, similar to gate control 230 and 235, respectively serve to selectively route the received input carrier through transmission line segments L3 and L4. Input integrated circuit regions or terminals 310a–d are intended to receive the output of the gate controls 230, 235, 237 and 239, respectively.

Like the circuit of FIG. 2, the juncture of drain regions of transistors 210 and 220 of switch 200c, generally depicted as numeral 320 in FIG. 3, serves as an input means for receiving the input carrier signal provided at the output 290 of switch 200b. In turn, the carrier signal selectively conducts through either transmission line segment L3 or L4, and be provided at the output of the juncture of drain regions of transistors 210 and 220 of switch 200d, generally depicted as numeral 345 in FIG. 3.

As illustrated in FIG. 3, thereshown is an amplifier section numerically identified as amplifier 380 that is intended to be driven or biased into saturation by way of DC bias signals identified as $V_o$ and $V_g$. The input of amplifier 380 is connected to the output means 345 of switch 200d. The "post amplifier" 380 is employed at the output so as to suppress any amplitude modulation and compensate for any signal insertion losses introduced by the phase shifting circuit, i.e. the combination of switches and transmission line segments comprising the phase bits. The employment of the saturated amplifier between the output 345 of the phase modulator section and the overall phase modulator output, numerically identified as numeral 400, permits maintaining a substantially constant amplitude for all phase states or bits.

In the preferred embodiment of the invention, amplifier 380 is intended to have a gain in the range of 6–10 dB at saturation which is intended to be adequate to overcome any loss introduced by the phase bit circuitry including the transmission line segments and switches.

In operation of the present invention, the amplitude of the input carrier signal F is intended to be adjusted to be large enough to ensure post-amplifier 380 being driven into power saturation. In this manner any amplitude variation between phase states caused by the phase bit circuitry is suppressed such that the output carrier signal is phase modulated with negligible unwanted amplitude modulation.

In the preferred embodiment of the invention, low power consumption is achieved by the employment of switching field effect transistors operated with zero drain voltage and only a control voltage at the alternative applied gate bias voltages.

In the actual construction of transmission line segments L2 & L4, transmission line segments L2 & L4 are provided with tuning stubs 390 and 392, respectively, in a well known manner, so as to achieve impedance matching to the FET switches 200a and 200b, and FET switches 200c and 200d, respectively. The stubs may be fabricated directly attached to the transmission line segments, or alternately, they may be detached allowing for bridging at a later time during the post fabrication tuning process. The tuning stubs are intended to enhance the performance of the device by compensating for some of the parasitic reactances introduced by the switching FETs thus reducing unwanted reflections and maximizing signal throughput.

In an exemplary embodiment of the invention, the phase modulator MMIC circuit of FIG. 3 is intended to be fabricated on a GaAs substrate designed to operate at 32 GHz. However, the phase shift modulator circuit of the present invention is intended to be fabricated so as to operate at a selected center frequency at mm-wave and microwave frequencies. The MMIC circuit is intended to be fabricated using standard GaAs PHEMT-based MMIC processes commonly used for mm-wave MMICs.

The operation of FIGS. 1 and 3 will now be described. Each of the gate control pairs 230 and 235, and 237 and 239 are independent of each other, and provide independent control the operation of corresponding pairs of switches, namely 200a and 200b, and 200c and 200d, respectively. Each of the gate control pairs are intended to provide complementary signals, i.e., [0, −2] or [−2, 0]. The path followed by input signal F and the resultant phase shift signal output at the output 345 of switch 200d is dependent upon the output signals of the complimentary gate control pairs—namely, (i) gate control 230 and gate control 235, and (ii)) gate control 237 and gate control 239. As one example, consider the reference path conducting through transmission line segments L1 and L3. This condition will result if (i) the output of gate control 235 and the gate control 239 are both −2 volts, and (ii) the output of 230 gate control and gate control 237 are both "0" volts.

It should be recognized that the circuit of FIG. 3 may be constructed to as to function as a Bi-phase Shift Key Modulator. This may be accomplished by idling the 90° phase shift bit—namely conduction only through the L1 path, and switching between the two paths L3 and L4. Alternatively, a circuit may be fabricated which only includes the 180° phase circuit comprising switches 200c and 200d, and the L3 gate control 237 and L4 gate control 239.

It should be recognized that there are an unlimited number of phase bits which may be constructed in accordance with the present invention. The value of the phase change being, of course, dependent upon the "difference value" between the pair of transmission line segments and their relation to other transmission line segment pairs.

It should be noted that practice of the present invention enables the production of a highly viable QPSK/BPSK phase modulator consistent with the requirements for a low cost and reliable production of a Monolithic Microwave Integrated Circuit (MMIC) implementation employing simple to fabricate transmission line segments of known properties. The entire RF circuit may be realized by way of a MMIC fabrication technology.

The simple design of the present invention achieves a phase modulator for switching between two or four phase states by routing or switching the carrier signal between two or four different transmission line segments, respectively, employed as delay lines judiciously chosen to achieve the intended phase separation of the phase states between the input carrier signal and the resultant output carrier signal.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment and devices, and that various modifications, both as to the equipment details and operating procedures, may be accomplished without departing from the true spirit and scope of the present invention.

More specifically, there is a wide array of circuit component techniques for the implementation of switches S1–S2. Although independent gate controls have been illustrated for controlling the field effect transistors which were employed to implement the function of switches S1–S4, they may be combined, or alternately arranged, to provide further simplicity of design, all of which are intended to be within the true spirit and scope of the present invention.

I claim:

1. A phase modulator for discretely varying the phase of an input carrier signal between at least two different phase states so as to provide a phase modulated carrier output signal having substantially constant amplitude over a selected bandwidth for all of said at least two different phase states, said phase modulator comprising:

at least first and second transmission line segments, where each of said first and second transmission line segments includes first and second terminating end regions, and where the length of said first and second transmission line segments differs by a first selected difference value determined at a desired operating carrier signal;

at least first and second switch means coupled to said first and second transmission line segments, wherein said first switch means includes an input means for receiving an input carrier signal, and said second switch means includes an output means, and wherein each of said first and second switch means is responsive to a control signal for causing said input carrier signal to conduct through a selective one of said first and second transmission line segments from said input means to said output means; and an amplifier means biased into saturation, said amplifier means having input means electrically coupled to said second switch output means, and an amplifier output for providing an amplifier output signal, where said amplifier output signal is a phase modulated output signal having substantially constant selected phase states, relative to said input carrier signal, over a narrow bandwidth.

2. The phase modulator of claim 1 wherein each of said first and second switch means serves as a single pole—double throw switch, and wherein:

said first switch means includes first and second field effect transistors, each having a drain terminating region, a source terminating region, and a gate terminating region, said first and second field effect transistors electrically connected such that:

said drain terminating regions are electrically connected in common and serve as a carrier signal input means adapted to receive an input carrier signal, said source terminating region of said first field effect transistor is electrically connected to said first terminating end region of said first transmission line segment, and said source terminating region of said second field effect transistor is electrically connected to said first terminating end region of said second transmission line segment;

said second switch means includes first and second field effect transistors, each having a drain terminating region, a source terminating region, and a gate terminating region, said first and second field transistors electrically connected such that:

said drain terminating regions are electrically connected in common and serves as a carrier output means adapted to provide an output carrier signal, said source terminating region of said first field effect transistor is electrically connected to said second terminating end region of said first transmission line segment, and said source terminating region of said second field effect transistor is electrically connected to said second terminating end region of said second transmission line segment; and each of said gate terminating regions electrically coupled to a control signal means for providing selective gate input voltages for each of said first and second field effect transistors of said first and second switch means such that (i) each of said first field effect transistors of each of said first and second switch means is in a selected conductive or non-conductive state, and (ii) each of said second field effect transistors of each of said first and second switch means is in an opposite state as that of said first field effect transistors.

3. The phase modulator of claim 2 where said all of said field effect transistors and said transmission line segments are fabricated in accordance with MMIC technology on a single substrate.

4. A phase modulator for discretely varying the phase of an input carrier signal between at least four different phase states and providing a phase modulated carrier output signal, said phase modulator comprising:

first and second transmission line segments, where each of said first and second transmission line segments includes first and second terminating end regions, and where the length of said first and second transmission line segments differ by a first selected difference value;

first and second switch means coupled to said first and second transmission line segments, wherein said first switch means includes a carrier signal input means adapted for receiving an input carrier signal, and said second switch means includes an output means, and wherein each of said first and second switch means includes a control input means for receiving a selected control signal for causing said input carrier signal to conduct through a selective one of said first and second transmission line segments from said input means to said second switch means output means thereby providing an intermediary carrier signal;

third and fourth transmission line segments, where each of said third and fourth transmission line segments includes first and second terminating end regions, and where the length of said third and fourth transmission line segments differ by a second selected difference value;

third and fourth switch means coupled to said third and fourth transmission line segments, wherein said third switch means includes an input means for receiving said intermediary carrier signal, and said fourth switch means includes an output means for providing an output carrier signal, and wherein each of said third and fourth switch means includes a control input means for receiving a selected control signal for causing said intermediary carrier signal to conduct through a selective one of said third and fourth transmission line segments from said input means of said third switch means to said output means of said fourth switch means;

an amplifier means biased into saturation, said amplifier means having input means electrically coupled to said output means of said fourth switch means, and an amplifier output for providing said phase modulated carrier output signal having a substantially constant selected phase state phase over a narrow bandwidth; and where said first difference value is substantially $\pi/2$, and said first difference value is substantially defined by:

$$\beta_2 L_2 - \beta_1 L_1$$

and, said second difference value is substantially $\pi$, and said second difference value is substantially defined by:

$$\beta_4 L_4 - \beta_3 L_3$$

where

L1, L2, L3, & L4=path length of said first, second, third, and fourth transmission line segments, respectively, $\beta_n = \omega_0/(v_{ph})_n$, real part of propagation constant (1/cm), where n corresponds to a respective one of said transmission line segments L1 through L4;

$\omega_0 = 2_\pi f_0$, radians, and $f_0$=desired center frequency of operation.

5. The phase modulator of claim 4 wherein each of said first, second, third, and fourth switch means serves as a single pole—double throw switch, and wherein:

(i) said first switch means includes first and second field effect transistors, each having a drain terminating region, a source terminating region, and a gate terminating region, said first and second field transistors electrically connected such that:

said drain terminating regions are electrically connected in common and serve as said carrier signal input means, said source terminating region of said first field effect transistor is electrically connected to said first terminating end region of said first transmission line segment, and said source terminating region of said second field effect transistor is electrically connected to said first terminating end region of said second transmission line segment;

(ii) said second switch means includes first and second field effect transistors, each having a drain terminating region, a source terminating region, and a gate terminating region, said first and second field transistors electrically connected such that:

said drain terminating regions are electrically connected in common and serve as a carrier output means adapted to provide said intermediary carrier signal, said source terminating region of said first field effect transistor is electrically connected to said second terminating end region of said first transmission line segment, and said source terminating region of said second field effect transistor is electrically connected to said second terminating end region of said second transmission line segment;

(iii) said third switch means includes first and second field effect transistors, each having a drain terminating region, a source terminating region, and a gate terminating region, said first and second field transistors of said third switch means electrically connected such that:

said drain terminating regions are electrically connected in common and serve as a carrier input means electrically coupled to said output carrier means of said second switch means for receiving said intermediary carrier signal therefrom, said source terminating region of said first field effect transistor is electrically connected to said first terminating end region of said third transmission line segment, and said source terminating region of said second field effect transistor is electrically connected to said first terminating end region of said fourth transmission line segment;

(iv) said fourth switch means includes first and second field effect transistors, each having a drain terminating region, a source terminating region, and a gate terminating region, said first and second field transistors electrically connected such that:

said drain terminating regions are electrically connected in common and serve as a carrier output means adapted to provide said phase modulated carrier output signal, said source terminating region of said first field effect transistor is electrically connected to said second terminating end region of said third transmission line segment, and said source terminating region of said second field effect transistor is electrically connected to said second terminating end region of said fourth transmission line segment; and each of said gate terminating regions electrically coupled to a control signal means for providing a selected gate input bias voltage for each of said first and second field effect transistors of each of said first, second, third, and fourth switch means such that:

each of said first field effect transistors of each of first and second switch means is in a selected conductive or non-conductive state, and each of said second field effect transistors of each of first and second switch means is in an opposite state as that of said first field effect transistors, and each of said first field effect transistors of each of third and fourth switch means is in a selected conductive or non-conductive state, and each of said second field effect transistors of each of third and fourth switch means is in an opposite state as that of said first field effect transistors of said third and fourth switch means, so that said carrier signal coupled to said input means associated with said first switch means is capable of passing through a selective one of said first and second transmission line segments, and a selective one of said third and fourth transmission line segments paths in response to said selected gate input bias voltages.

6. The phase modulator of claim 5 where said control signal means provides a gate input bias voltage for each of said first and second field effect transistors of each of said first, second, third, and fourth switch means through an isolation circuit means.

7. The phase modulator of claim 4 where said all of said field effect transistors and said transmission line segments, and said amplifier means are fabricated in accordance with MMIC technology on a single substrate.

* * * * *